(12) United States Patent
Gailloux

(10) Patent No.: US 11,574,332 B1
(45) Date of Patent: Feb. 7, 2023

(54) METHOD FOR GENERATING AND USING A 2D BARCODE

(71) Applicant: Sprint Communications Company L.P., Overland Park, KS (US)

(72) Inventor: Michael A. Gailloux, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 160 days.

(21) Appl. No.: 17/170,555

(22) Filed: Feb. 8, 2021

Related U.S. Application Data

(62) Division of application No. 16/017,048, filed on Jun. 25, 2018, now Pat. No. 10,949,869.

(51) Int. Cl.
*G06Q 30/02* (2012.01)
*G06K 19/06* (2006.01)

(52) U.S. Cl.
CPC ... *G06Q 30/0224* (2013.01); *G06K 19/06009* (2013.01); *G06Q 30/0235* (2013.01)

(58) Field of Classification Search
None
See application file for complete search history.

(56) References Cited

U.S. PATENT DOCUMENTS

| | | |
|---|---|---|
| 8,556,164 B1 | 10/2013 | Freedman et al. |
| 9,710,829 B1 | 7/2017 | Sitapara et al. |
| 9,712,677 B1 | 7/2017 | Koster |
| 10,114,999 B1 * | 10/2018 | Burke ............... G06Q 30/0207 |
| 10,251,064 B1 | 4/2019 | Indurkar |
| 10,949,869 B1 | 3/2021 | Gailloux |

(Continued)

FOREIGN PATENT DOCUMENTS

| | | |
|---|---|---|
| EP | 2364043 A1 | 4/2016 |
| IN | 899/DEL/2005 A | 1/2007 |

(Continued)

OTHER PUBLICATIONS

Gao et al., A 2D Barcode-Based Mobile Payment System, 2009 Third International Conference on Multimedia and Ubiquitous Engineering.*

(Continued)

*Primary Examiner* — David J Stoltenberg

(57) ABSTRACT

A method of generating and using a 2D barcode to provide an authenticated service subscriber with an adapted offer comprising monitoring and identifying, by a monitoring application associated with a first service provider, a social network for keywords related to a negative subscriber interaction with a second service provider; engaging a subscriber associated with the negative interaction by the first service provider; generating a one-time use 2D barcode associated with an offer and comprising embedded subscriber information; storing the barcode in a data store; sending the barcode to a mobile device; presenting and scanning the barcode; decoding the information by an offer application; authenticating the identity of the subscriber; adapting the offer based on the subscriber information; searching an inventory data store associated with a physical retail location of the first service provider; locating and presenting the adapted offer; and marking the barcode as expired in the barcode data store.

20 Claims, 7 Drawing Sheets

(56) References Cited

U.S. PATENT DOCUMENTS

| | | |
|---|---|---|
| 2006/0111967 A1 | 5/2006 | Forbes |
| 2008/0281910 A1 | 11/2008 | Trioano et al. |
| 2010/0157823 A1 | 6/2010 | Li et al. |
| 2011/0029385 A1 | 2/2011 | Engel et al. |
| 2011/0130118 A1 | 6/2011 | Fan et al. |
| 2011/0208659 A1 | 8/2011 | Easterly et al. |
| 2011/0276382 A1 | 11/2011 | Ramchandani et al. |
| 2012/0109762 A1 | 5/2012 | Getchius |
| 2012/0191844 A1 | 7/2012 | Boyns et al. |
| 2012/0265696 A1 | 10/2012 | Tuchman et al. |
| 2012/0276867 A1 | 11/2012 | Mcnamee et al. |
| 2013/0018957 A1 | 1/2013 | Parnaby et al. |
| 2013/0032634 A1* | 2/2013 | McKirdy ............. A61B 5/0205 235/375 |
| 2013/0082100 A1 | 4/2013 | Stavrou et al. |
| 2013/0132854 A1 | 5/2013 | Raleigh et al. |
| 2013/0179440 A1 | 7/2013 | Gordon |
| 2013/0217361 A1 | 8/2013 | Mohammed et al. |
| 2013/0282594 A1 | 10/2013 | Gaedcke et al. |
| 2013/0311485 A1 | 11/2013 | Khan |
| 2014/0006219 A1 | 1/2014 | Wouhaybi et al. |
| 2014/0047029 A1 | 2/2014 | Appelman et al. |
| 2014/0150067 A1 | 5/2014 | Salkintzis et al. |
| 2014/0180788 A1 | 6/2014 | George et al. |
| 2014/0207560 A1 | 7/2014 | Dandekar et al. |
| 2014/0207562 A1 | 7/2014 | Gupta et al. |
| 2014/0274036 A1 | 9/2014 | Fan et al. |
| 2015/0032675 A1 | 1/2015 | Huehn et al. |
| 2015/0100416 A1 | 4/2015 | Blackhurst et al. |
| 2015/0100433 A1 | 4/2015 | Choy et al. |
| 2015/0112753 A1 | 4/2015 | Suvarna |
| 2015/0170152 A1 | 6/2015 | Shaffer et al. |
| 2015/0254703 A1 | 9/2015 | Epner et al. |
| 2015/0312632 A1 | 10/2015 | Hoctor et al. |
| 2015/0339675 A1 | 11/2015 | Tuchman et al. |
| 2015/0363867 A1 | 12/2015 | Tipton et al. |
| 2016/0042366 A1 | 2/2016 | Lux et al. |
| 2016/0179959 A1 | 6/2016 | Mosley et al. |
| 2016/0212071 A1 | 7/2016 | Hannah et al. |
| 2016/0361599 A1 | 12/2016 | Mckirdy |
| 2017/0046729 A1 | 2/2017 | Breslin |
| 2017/0078861 A1 | 3/2017 | Mcnamee et al. |
| 2017/0109757 A1 | 4/2017 | Tuchman et al. |
| 2017/0124606 A1 | 5/2017 | Belle |
| 2017/0180567 A1 | 6/2017 | Sharma et al. |
| 2017/0193611 A1 | 7/2017 | Vassilev et al. |
| 2017/0200193 A1 | 7/2017 | Bigley |
| 2017/0243242 A1* | 8/2017 | Chaikin ............... G06Q 20/204 |
| 2017/0278127 A1 | 9/2017 | Smrzlic et al. |
| 2017/0317965 A1 | 11/2017 | Harasimiuk et al. |
| 2017/0339081 A1 | 11/2017 | Beust |
| 2018/0020354 A1 | 1/2018 | Felt et al. |
| 2018/0197099 A1 | 7/2018 | Liang et al. |
| 2018/0211211 A1 | 7/2018 | Schwartz |
| 2018/0232362 A1 | 8/2018 | Khan |
| 2018/0253783 A1 | 9/2018 | Nuzzi et al. |
| 2019/0028865 A1 | 1/2019 | Raleigh et al. |
| 2019/0066073 A1 | 2/2019 | Yen et al. |
| 2020/0045519 A1 | 2/2020 | Raleigh et al. |
| 2020/0184516 A1 | 6/2020 | Bigley |

FOREIGN PATENT DOCUMENTS

| | | | |
|---|---|---|---|
| KR | 20010090987 A | 10/2001 | |
| TW | 201201112 A | 1/2012 | |
| WO | 2009116954 A2 | 9/2009 | |
| WO | WO 2013/149200 * | 3/2013 | ......... G06Q 20/3274 |
| WO | 2014032549 A1 | 3/2014 | |
| WO | 2016013924 A1 | 1/2016 | |

OTHER PUBLICATIONS

Chang; A Secure Operational Model for Mobile Payments, Scientific World Journal vol. 2014, Article ID 626243.*

Restriction Requirement dated Jun. 5, 2020, U.S. Appl. No. 16/017,048, filed Jun. 25, 2018.

Notice of Allowance dated Nov. 16, 2020, U.S. Appl. No. 16/017,048, filed Jun. 25, 2018.

Bahtia, et al., "Monitoring and Analyzing Customer Feedback Through Social Media Platforms for Identifying and Remedying Customer Problems," IEEE/ACM International Conference on Advances in Social Networks Analysis and Mining, 2013.

Weng, et al., "Application of Mobile 2D Barcode in China," 978-1-4244-2108-4/08/$25.00 © 2008 IEEE.

* cited by examiner

METHOD FOR GENERATING AND USING A 2D BARCODE

CROSS-REFERENCE TO RELATED APPLICATIONS

Statement Regarding Federally Sponsored Research or Development

This application is a divisional of and claims priority under 35 U.S.C. § 120 to U.S. patent application Ser. No. 16/017,048, filed on Jun. 25, 2018, entitled "Method for Generating and Using a 2D Barcode," by Michael A. Gailloux, which is incorporated herein by reference in its entirety for all purposes.

REFERENCE TO A MICROFICHE APPENDIX

Not applicable.

BACKGROUND

Millions of people use social media networks to interact with others. Users of social networks may create user profiles and post content related to their lives. User profiles may comprise personal information, such as demographic information. Posts by users may express opinions, thoughts, and/or general messages for others to view. Hundreds of millions of posts about a variety of topics may be transmitted over social networks every day. Social networks may also be used to disseminate information.

SUMMARY

In an embodiment, a method of generating and using a 2D barcode to provide an authenticated service subscriber with an adapted offer is disclosed. The method comprises: monitoring, by a social network monitoring application executing on a network server associated with a first wireless communication service provider, a social network website for content comprising one or more keywords related to a negative service subscriber interaction with a second wireless communication service provider and identifying, by the social network monitoring application, content comprising one or more keywords related to the negative service subscriber interaction with the second wireless communication service provider. The method further comprises engaging a service subscriber associated with the negative service subscriber interaction by the first wireless communication service provider, wherein the service subscriber is associated with the second wireless communication service provider, obtaining service subscriber information associated with the service subscriber by the first wireless communication service provider, generating a one-time use 2D barcode by a barcode application executing on the network server, wherein the one-time use 2D barcode is associated with an offer associated with the first wireless communication service provider and comprises embedded service subscriber information, storing by the barcode application the one-time use 2D barcode in a barcode data store, and sending the one-time use 2D barcode by the barcode application to a mobile communication device of the service subscriber. The method further comprises presenting the one-time use 2D barcode on a display of the mobile communication device, scanning the one-time use 2D barcode by a barcode scanner coupled to a computer system, decoding the embedded service subscriber information by an offer application executing on the computer system from the one-time use 2D barcode, authenticating the identity of the service subscriber by the offer application based on the embedded service subscriber information, and adapting the offer by the offer application to the service subscriber based on the service subscriber information decoded from the one-time use 2D barcode, wherein the adapted offer identifies a mobile communication device model. Based on the adapted offer, searching an inventory data store of the first wireless communication service provider by the offer application, wherein the inventory data store is associated with a physical retail location of the first wireless communication provider, locating the mobile communication device model in the inventory data store by the offer application, presenting the adapted offer to the service subscriber by the offer application, and upon accepting the offer by the service subscriber, marking the one-time use 2D barcode as expired in the barcode data store by the offer application.

In another embodiment, a method of generating and using a one-time use 2D barcode to provide an authenticated service subscriber with an adapted offer is disclosed. The method comprises generating by a barcode application executing on a network server a one-time use 2D barcode based on service subscriber information associated with a service subscriber, wherein the one-time use 2D barcode is associated with an offer, and wherein the offer is restricted to the service subscriber, storing the one-time use 2D barcode by the barcode application in a barcode data store, and sending the one-time use 2D barcode by the barcode application to a current mobile communication device of the service subscriber. The method further comprises presenting the one-time use 2D barcode on a display of the current mobile communication device, scanning the one-time use 2D barcode by a barcode scanner coupled to a computer system, decoding, by an offer application executing on the computer system, the embedded service subscriber information from the one-time use 2D barcode, authenticating the identity of the service subscriber by the offer application based on the embedded service subscriber information, and adapting the offer by the offer application to the service subscriber based on the service subscriber information decoded from the one-time use 2D barcode. Adapting the offer comprises: determining by the offer application the model of the current mobile communication device of the service subscriber, searching by the offer application an inventory data store of the wireless communication service provider for a new mobile communication device, wherein the new mobile communication device is an updated model of the current mobile communication device of the service subscriber, wherein the inventory data store is associated with a physical retail location of the wireless communication service provider, and locating the new mobile communication device by the offer application in the inventory data store. The method further comprises, presenting the adapted offer by the offer application to the service subscriber, and upon accepting the adapted offer, marking by the offer application the one-time use 2D barcode as expired in the barcode data store.

In yet another embodiment, a method of generating an adapted offer for use by an authenticated service subscriber based on service subscriber information decoded from a one-time use 2D barcode is disclosed. The method comprises determining, by an offer application executing on a computer system, a model of a current mobile communication device of a service subscriber, selecting, by the offer application, a first mobile communication device based on the service subscriber information, searching, by the offer application, an inventory data store of a wireless communication service provider for the first mobile communication device, wherein the inventory data store is associated with a physical retail location of the wireless communication service provider, and determining, by the offer application, that the first mobile communication device is out-of-stock according to the inventory data store. The method further comprises selecting, by the offer application, a second mobile communication device, wherein the second mobile communication device is different from the first mobile communication device, searching, by the offer application, the inventory data store of the wireless communication service provider for the second mobile communication device, and locating, by the offer application, an entry associated with the second mobile communication device in the inventory data store. The method further comprises presenting, by the offer application, the adapted offer to the service subscriber, wherein the adapted offer comprises at least providing the second mobile communication device to the service subscriber and upon accepting the adapted offer, marking, by the offer application, the one-time use 2D barcode as expired in a barcode data store.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
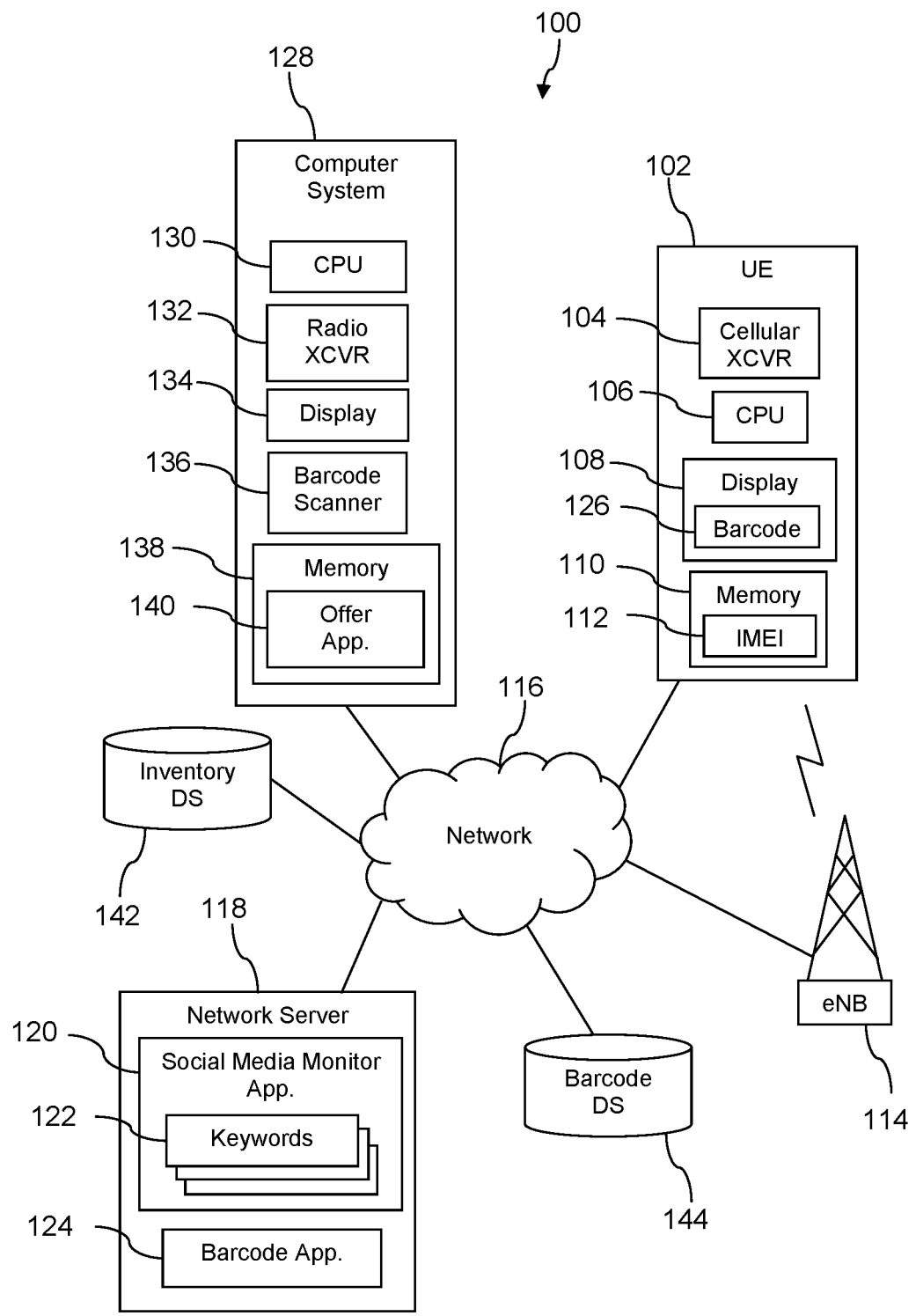
FIG. 1 is an illustration of communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches methods of generating and using a one-time use 2D barcode to provide an authenticated service subscriber with an adapted offer. Identifying potential service subscribers from millions of people and connecting them to a dynamically adapted offer customized based on their information may be challenging for a service provider. A wireless communication service provider may present the adapted offers to potential service subscribers who are identified through monitoring social network websites. The wireless communication service provider may screen for keywords or phrases across millions of social network accounts to identify users who are unsatisfied with their current wireless communication service and engage these unsatisfied users with an offer comprising an incentive to change wireless communication service providers. For example, the incentive may be a discounted mobile communication device and/or a discounted plan for wireless communication service. Furthermore, the offer may be adapted dynamically based on information obtained directly or indirectly (e.g., social media accounts) from the potential service subscriber.

The offer may be sent over a network to a current mobile communication device of the wireless communication service subscriber as an electronic code, for example, as a two-dimensional (2D) barcode. Restricting the one-time use 2D barcode to prevent others from fraudulently redeeming the adapted offer may be technically challenging. For example, if the one-time use 2D barcode was shared with other people (e.g., distributed over the Internet, shared with a friend) those people may visit a retail location of the service provider to redeem the offer. Prior to generating the 2D barcode, the wireless communication service provider may request information from the service subscriber in order to configure the 2D barcode to be unique for each service subscriber. The wireless communication service subscriber information may be personal information (e.g., first name, last name, address, zip code), current mobile communication device information (e.g., IMEI, serial number, model and type), and/or a social media information (e.g., username, handle, tag). The wireless communication service provider may embed the wireless communication service subscriber information in the 2D barcode to prevent fraudulent use or unintentional distribution of the offer. The wireless communication service provider may store the generated 2D barcode in a barcode data store over the wireless communication network before sending the 2D barcode to the wireless communication service subscriber. The 2D barcode may be a one-time use 2D barcode so that it may be marked as expired in the barcode data store after the offer has been redeemed. If another person attempts to redeem the offer, the 2D barcode would be invalid and the offer would not be redeemable. In some embodiments, the 2D barcode may comprise an embedded timestamp so that the offer expires after a predetermined amount of time. For example, if not redeemed after one day, one week, two weeks, or one month, the 2D barcode and associated offer may expire and no longer be valid.

The service subscriber may redeem the offer at a physical retail location of the wireless communication service provider by presenting the 2D barcode on a display of the current mobile communication device. The 2D barcode may be scanned with a barcode scanner and the wireless communication service subscriber information may be decoded by an offer application executing on a computer system, such as a kiosk in the store. The service subscriber may answer questions associated with the wireless communication service subscriber information in order to authenticate his or her identity to prevent fraudulent use of the offer. For example, the service subscriber may be asked to provide an address and/or the IMEI of the current mobile communication device.

The wireless communication service provider may determine the model of the current mobile communication device based on the IMEI of the current mobile communication device. Also, based on social media information (e.g., username, handle, tag), the wireless communication service provider may determine additional information (e.g., demographics, household size, income level, frequently used communication services). An offer application executing on the computer system may adapt the offer based on the information collected for each service subscriber to improve the likelihood that the service subscriber would redeem the offer and the wireless communication service provider would acquire a new customer. For example, the offer application may adapt the offer to comprise a new mobile communication device that is an updated model of the current mobile communication device at a discounted price.

The offer application may use up-to-the-minute data to generate an adapted offer. For another example, the offer may also be adapted based on current business performance parameters such as quotas and/or profit goals of the wireless communication service provider. The offer application may evaluate the progress towards a monthly sales quota and adapt the offer based on the progress. The adapted offer may be associated with the current inventory of the physical retail location. The offer application may search an inventory data store of the physical retail location the service subscriber visited and locate the new mobile communication device before presenting the adapted offer to the service subscriber. In some instances, the new mobile communication device of the adapted offer may not be available at the physical retail location. The offer application may then select a second new mobile communication device to present to the service subscriber. The service subscriber may accept the adapted offer and be provisioned to receive service on the network infrastructure of the service provider. The barcode application may evaluate the 2D barcode as expired in the barcode data store.

In some instances, the service subscriber may refuse the adapted offer and leave the physical retail location without purchasing a service plan or new mobile communication device. The offer application may gather metrics associated with the redemption and/or refusal of the adapted offer and autonomously modify the adapted offers to optimize certain metrics (e.g., profit, acceptance rate). For example, the offer application may modify the adapted offer to provide a steeper discount to the service subscriber to improve the acceptance rate if a threshold of offer refusals is reached. In another instance, the offer application may adapt the offer so the service provider achieves a greater profit margin.

Turning now to FIG. 1, a system 100 is described. In an embodiment, the system 100 comprises a user equipment (UE) 102 that comprises a cellular radio transceiver 104, a processor 106, a display 108, and a memory 110 that comprises an international mobile equipment identifier (IMEI) 112. The IMEI 112 may be stored in a non-transitory portion of the memory 110. The cellular radio transceiver 104 may establish a wireless communication link with a cell site 114 according to one or more of a long term evolution (LTE), code division multiple access (CDMA), global system for mobile communication (GSM), or worldwide interoperability for microwave access (WiMAX) wireless telecommunications protocol. In some instances, the UE 102 may be referred to as a mobile communication device 102. The cell site 114 may communicatively couple the device 102 to a network 116 to promote the device 102 placing voice calls or establishing data communication sessions. The device 102 may be a mobile phone, a smart phone, a personal digital assistant (PDA), a wearable computer, a headset computer, a laptop computer, a tablet computer, or a notebook computer. The device 102 may browse web sites, such as social media websites, via the network 116. The network 116 may comprise one or more public networks, one or more private networks, or a combination thereof. A portion of the network 116 may be operated by a wireless communication service provider. The system 100 may comprise any number of mobile communication devices 102 and any number of cell sites 114. In an embodiment, the system 100 may comprise tens of millions of devices 102 and tens of thousands of cell sites 114.

In an embodiment, a first wireless communication service provider may be interested in acquiring new wireless communication service subscribers. A user of the device 102 may be subscribed to receive wireless communication service from a second wireless communication service provider over the network 116. The user of device 102 may post negative comments on social media websites about the second service provider. A social media monitoring application 120 executing on a network server 118 associated with the first service provider may monitor social media websites for content comprising one or more keywords 122 related to a negative service subscriber interaction with the second service provider and identify an unsatisfied service subscriber who is subscribed to receive wireless communication service from the second service provider. The keywords 122 may be words or phrases associated with the second service provider and/or words or phrases associated with a negative experience. For example, the keywords 122 may comprise words or phrases like the following: "dropped call," "call drop," "bad connection," "bad coverage," "poor coverage," "poor reception," "delayed response," "slow Internet," "bad service," or other combinations of words or phrases that may be associated with a negative experience with a wireless communication service provider.

Upon identifying the potential service subscriber, the first service provider may engage the unsatisfied service subscriber, for example, by initiating a private dialogue or by inviting the service subscriber to an online chatroom. In the private dialogue, the first service subscriber may propose an offer to the service subscriber as an incentive to switch from the second service provider to the first service provider. If the service subscriber expresses interest, the first service provider may then obtain wireless communication service subscriber information from the potential service subscriber. For example, the first service provider may ask questions related to the service subscriber's current wireless communication plan (e.g., cost, features, length of contract) and/or a model of the service subscriber's current mobile communication device 102. The wireless communication service subscriber information may also comprise personal information (e.g., first name, last name, address, zip code), current mobile communication device information (e.g., IMEI, serial number, model and type), and/or a social media information (e.g., username, handle, tag).

The network server 118 further comprises a barcode application 124 that generates a one-time use 2D barcode 126, wherein the one-time use 2D barcode 126 is associated with the offer from the first service provider and comprises embedded wireless communication service subscriber information. In an embodiment, the network server 118 may be a computer system comprising one or more computers or servers. The monitoring application 120 and barcode application 124 may execute on the same network server 118 or different computers in a single network server 118 computer system. In an embodiment, the one-time use 2D barcode may be a QR code, Semacode, ShotCode, or any other type of 2D barcode. While the present disclosure teaches using a 2D barcode, it is appreciated that any type of electronic coding technology may be used. For example, a near-field communication (NFC) device, a radio-frequency identification (RFID) tag, and/or other types of barcodes may be used with the system and methods disclosed herein. The barcode application 124 may store the one-time use barcode 126 in a barcode data store 144 and send the one-time use 2D barcode 126 to a current mobile communication device 102 of the service subscriber. In an embodiment, a first name, a last name, a phone number, an IMEI 112, a unique identifier of the one-time use 2D barcode 126, and/or a reference to the barcode data store 144 may be encoded on the one-time use 2D barcode 126. In an embodiment, the one-time use 2D barcode may comprise a unique handle or reference used to look up additional wireless communication subscriber information and/or offer details stored in the barcode data store 112. The one-time use 2D barcode 126 may be configured so that it may be marked as expired after the offer is redeemed. The barcode application 124 may send or transmit the one-time use 2D barcode 126 to the device 102 of the service subscriber.

The service subscriber may visit a physical retail location associated with the first service provider and present the one-time use 2D barcode 126 on the display 108 of the device 102. The physical retail location may comprise a computer system 128 further comprising a processor 130, a radio transceiver 132, a display 134, a barcode scanner 136, and a memory 138. The barcode scanner 136 may be coupled to the computer system 128 so that the embedded information in the one-time use 2D barcode 126 is transmitted to the computer system 128 after being scanned by the barcode scanner 136. A representative may use the barcode scanner 136 to scan the one-time use 2D barcode 126 presented on the display 108 of the device 102. In another embodiment, the service subscriber may be directed to a self-serve kiosk and prompted to scan the one-time use 2D barcode 126.

Upon executing an offer application 140 stored in the memory 138 of the computer system 128 by the processor 130, the offer application 140 may decode the wireless communication service subscriber information embedded in the one-time use 2D barcode 126. The display 134 of the computer system 128 may prompt the service subscriber to authenticate his or her identity based on the information decoded from the one-time use 2D barcode 126. For example, the service subscriber may be asked for the IMEI 112 of the device 102 and/or a zip code associated with the service subscriber. Authenticating the identity of the service subscriber may prevent the one-time use 2D barcode 126 from being fraudulently used or shared amongst people, such as over the Internet. Once the service subscriber's identity has been verified, the offer application 140 may adapt the offer based on the decoded wireless communication service subscriber information.

In an embodiment the offer application 140 may automatically generate the adapted offer based on one or more service subscriber factors including service subscriber residence location, age, income, education level, current monthly service bill, household size, zip-code, gender, and/or other factors. These factors may further be sorted in categories such as service history information, demographics information, behavior information, and other categories. In an embodiment, information from the categories may be prioritized or weighted in adapting the offer. Some service subscriber information may be obtained from the private dialogue with the service subscriber. Other service subscriber information may be obtained from a third party leveraging information based on the service subscriber information provided by the service subscriber (e.g., social media information, advertisement ID tags). For example, the offer application 140 may select a more recent model of the current mobile device 102 of the service subscriber and discount the price based on his or her household income. For another example, the offer application 140 may reduce the monthly service plan cost to be cheaper than the service subscriber's current service plan and/or present a service plan that has more wireless communication features (e.g., unlimited data, unlimited messaging) than the current service plan.

In an embodiment, the offer application 140 may generate the adapted offer based on one or more business parameters of the first wireless communication service provider. A business parameter may be comprise of monthly quotas, quarterly quotas, yearly quotas, progress towards a quota, point of time during a quota time period (e.g., month, quarter, year), or other business parameters. Adapting the offer by the offer application 140 may comprise weighting one or more business parameters. The offer application 140 may account for the current status of one or more business parameters of the first wireless communication service provider when adapting the offer. For example, the first wireless communication service provider may be less than halfway from reaching the monthly quota during the middle of the month. The offer application 140 may offer a cheaper mobile communication device to further incentivize the service subscriber to accept the offer to help the wireless communication service provider reach the monthly quota.

Before presenting the adapted offer to the service subscriber, the offer application 140 may search an inventory data store 142 associated with the physical retail location for the new mobile device 102 associated with the adapted offer. While it is illustrated that the inventory data store 142 resides remotely from the computer system 128, the inventory data store 142 may be stored locally, such as in the memory 110. The inventory data store 142 may be stored in a non-transitory portion of the memory 140 of the computer system 128. The offer application 140 may search the inventory data store 142 to ensure the new mobile device 102 is currently in-stock at the physical retail location. Upon locating the new mobile device 102 in the inventory data store 142, the offer application 140 may then present the adapted offer on the display 140 for the service subscriber.

In some embodiments, the new mobile device 102 may be out-of-stock. After determining that the new mobile device 102 is not available, the offer application 140 may adapt the offer and select a second mobile device 102 to present to the service subscriber, wherein the first and second mobile device 102 are different. For example, the second mobile device 102 may comprise different hardware features than the first mobile device 102, such as a larger memory 110 or a faster processor 106. For another example, the second mobile device 102 may be a different model than the first mobile device 102. The offer application 140 may search the inventory data store 142 for the second mobile device 102, locate the second mobile device 102, and present the adapted offer to the service subscriber. The process of selecting and locating the mobile device 102 of the adapted offer may repeat until the mobile device 102 is located in the inventory data store 142. If the service subscriber accepts the adapted offer presented on the display 134, the offer application 140 may mark the one-time use 2D barcode 126 as expired in the barcode data store 144.

Figure 2A:
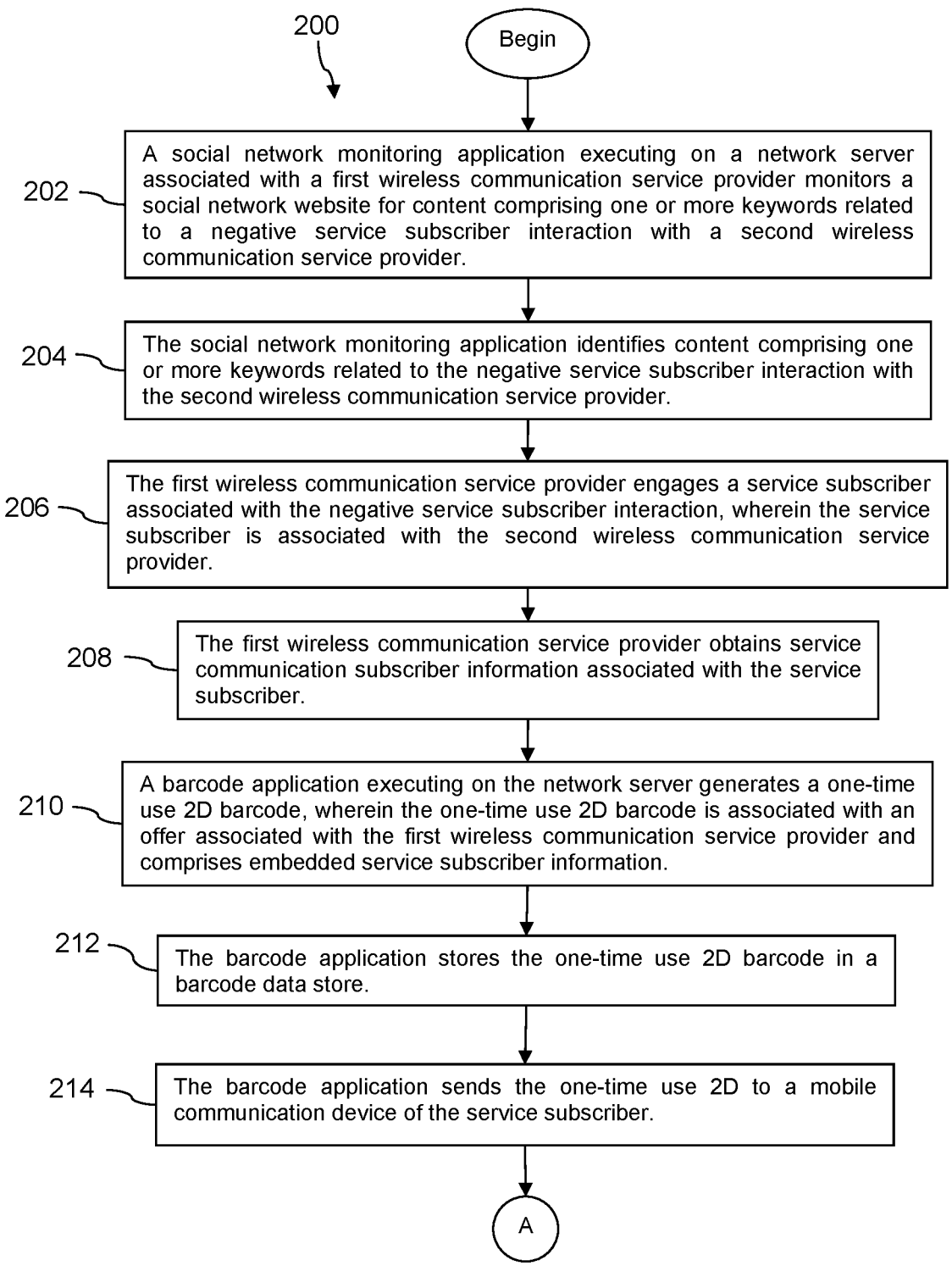
FIG. 2A and FIG. 2B are a flow chart of a method according to an embodiment of the disclosure.
Figure 2B:
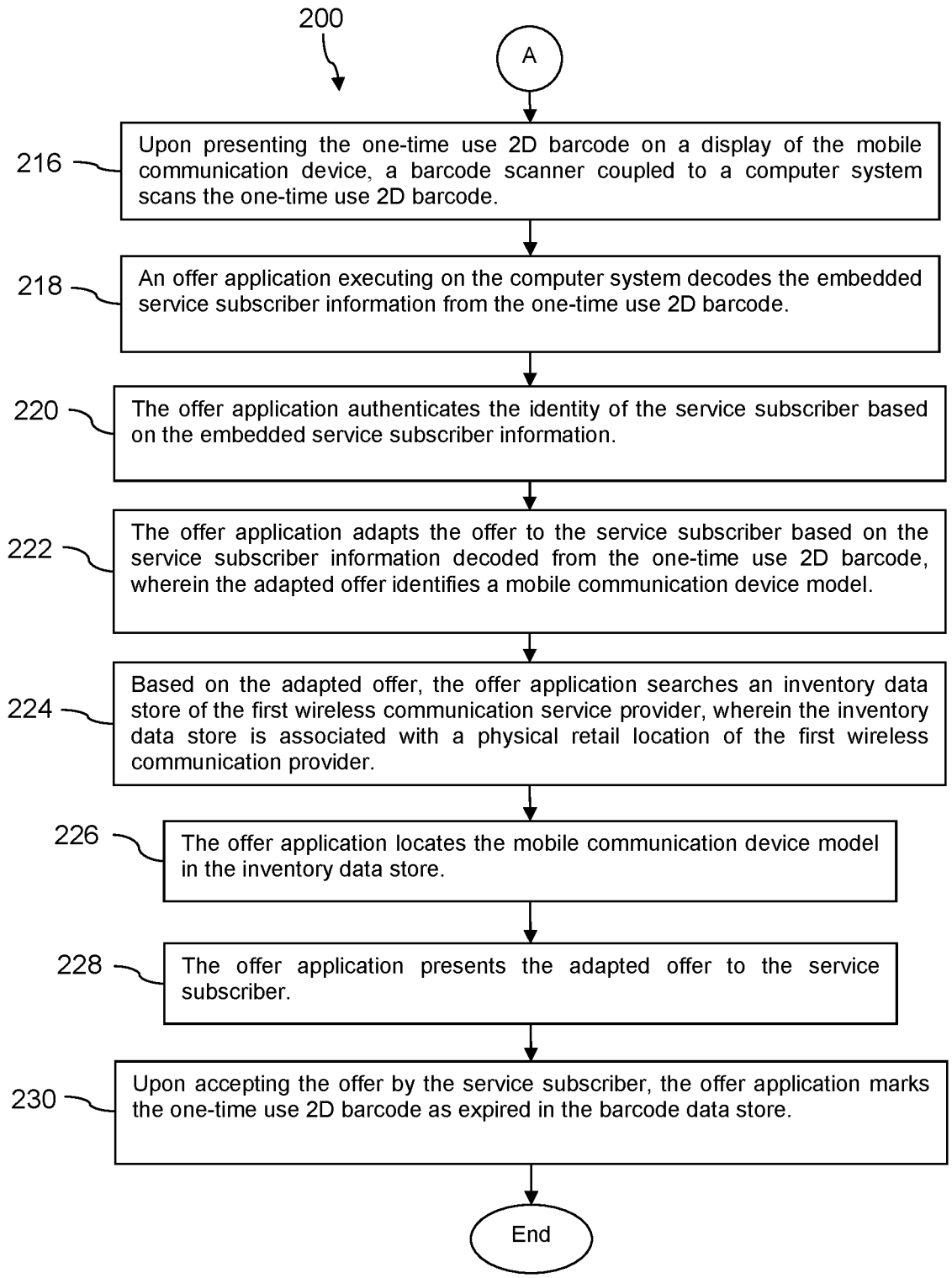

Turning now to FIGS. 2A and 2B, a method 200 is described. At block 202, a social network monitoring application executing on a network server associated with a first wireless communication service provider monitors a social network website for content comprising one or more keywords related to a negative service subscriber interaction with a second wireless communication service provider. At block 204, the social network monitoring application identifies content comprising one or more keywords related to the negative service subscriber interaction with the second wireless communication service provider. At block 206, the first wireless communication service provider engages a service subscriber associated with the negative service subscriber interaction, wherein the service subscriber is associated with the second wireless communication service provider. The wireless communication service provider may engage the service subscriber by privately messaging them on the social media platform the social network monitoring application detects the negative interaction and/or inviting the service subscriber to an online chatroom managed by the service provider.

At block 208, the first wireless communication service provider obtains service subscriber information associated with the service subscriber. At block 210, a barcode application executing on the network server generates a one-time use 2D barcode, wherein the one-time use 2D barcode is associated with an offer associated with the first wireless communication service provider and comprises embedded service subscriber information. At block 212, the barcode application stores the one-time use 2D barcode in a barcode data store. At block 214, the barcode application sends the one-time use 2D to a mobile communication device of the service subscriber.

At block 216, upon presenting the one-time use 2D barcode on a display of the mobile communication device, a barcode scanner coupled to a computer system scans the one-time use 2D barcode. At block 218, an offer application executing on the computer system decodes the embedded service subscriber information from the one-time use 2D barcode. At block 220, the offer application authenticates the identity of the service subscriber based on the embedded service subscriber information. At block 222, the offer application adapts the offer to the service subscriber based on the service subscriber information decoded from the one-time use 2D barcode, wherein the adapted offer identifies a mobile communication device model. The offer application 140 may also use the service subscriber information stored in the barcode data store 144 to generate the adapted offer. In an embodiment, at least some data used in adapting the offer is up-to-the-minute data. For example, current business performance data may be used to generate the adapted offer. Business performance data may change from time to time, such as from one minute to the next, from morning to afternoon, from day to day, and affect the adapted offer presented to the service subscriber. At block 224, based on the adapted offer, the offer application searches an inventory data store of the first wireless communication service provider, wherein the inventory data store is associated with a physical retail location of the first wireless communication provider.

At block 226, the offer application locates the mobile communication device model in the inventory data store. At block 228, the offer application presents the adapted offer to the service subscriber. At block 230, upon accepting the offer by the service subscriber, the offer application marks the one-time use 2D barcode as expired in the barcode data store.

Figure 3A:
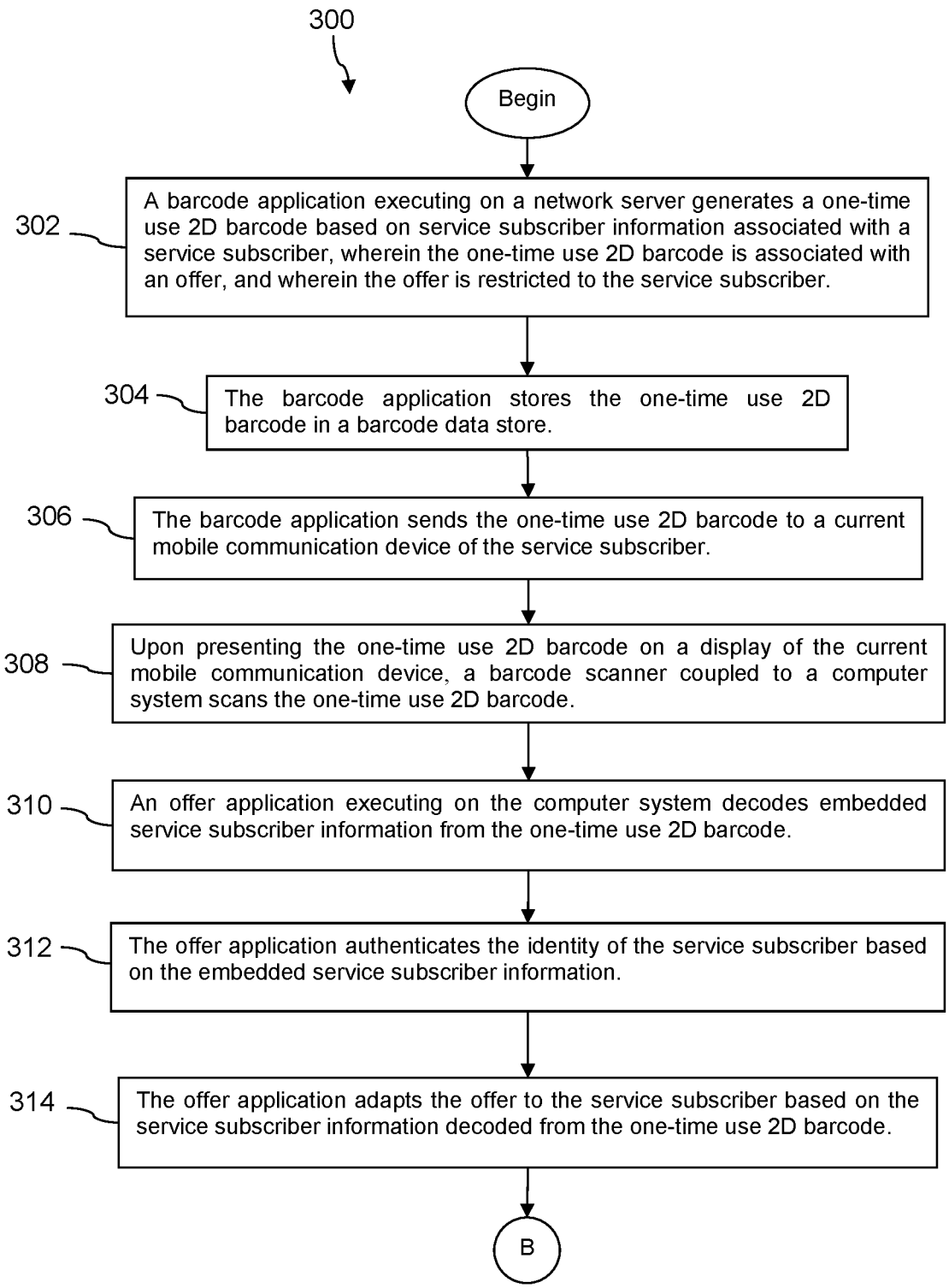
FIG. 3A and FIG. 3B are a flow chart of another method according to an embodiment of the disclosure.
Figure 3B:
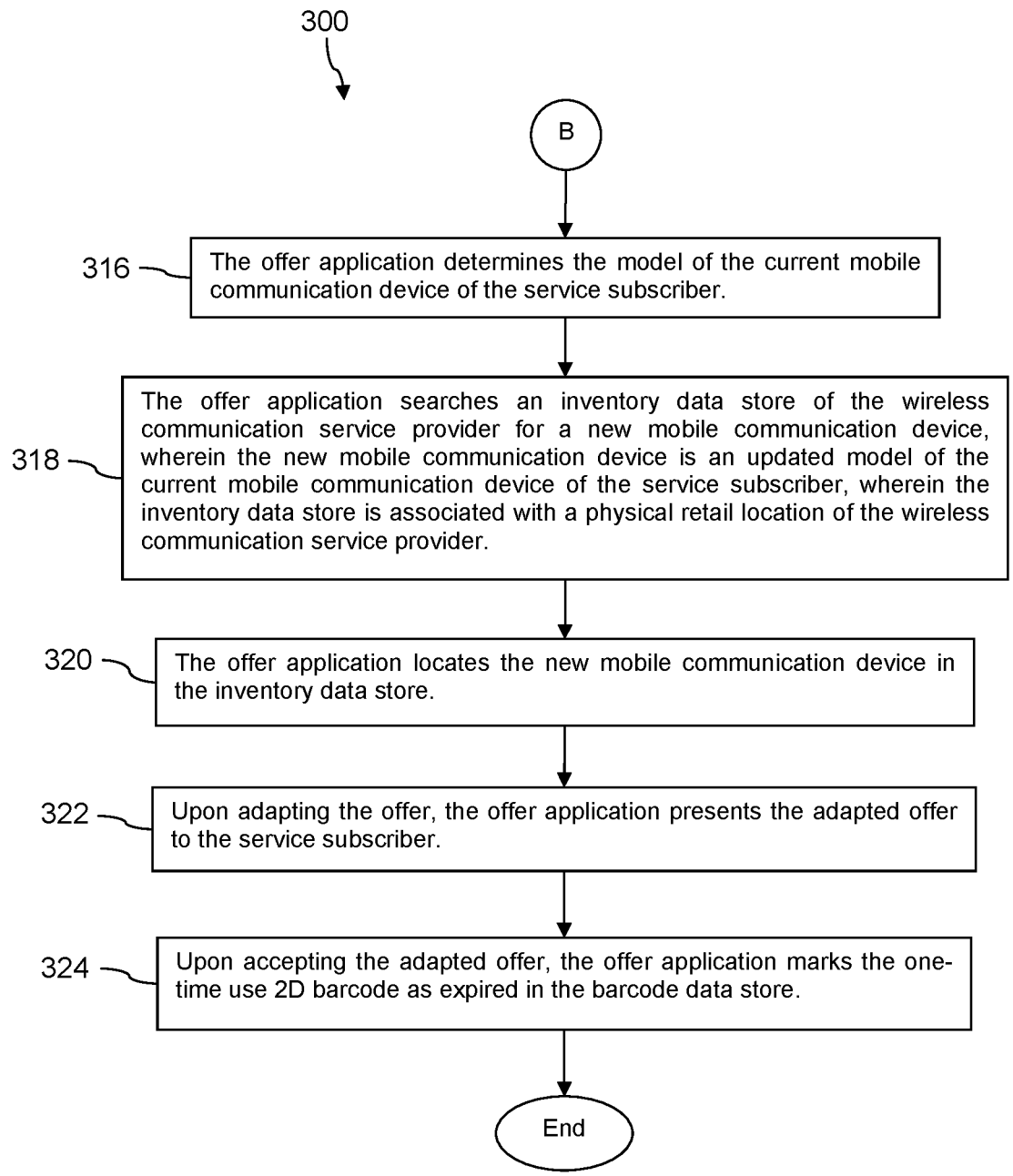

Turning now to FIGS. 3A and 3B, a method 300 is described. At block 302, a barcode application executing on a network server generates a one-time use 2D barcode based on service subscriber information associated with a service subscriber, wherein the one-time use 2D barcode is associated with an offer, and wherein the offer is restricted to the service subscriber. For example, the offer may be restricted to the owner of the mobile communication device 102 and he or she may be asked to provide proof of identity that matches the service subscriber information encoded on the one-time use 2D barcode before redeeming the offer. If an individual fails to provide proof of identity matching the service subscriber information encoded on the one-time use 2D barcode, he or she may not be able to redeem the offer. At block 304, the barcode application stores the one-time use 2D barcode in a barcode data store. At block 306, the barcode application sends the one-time use 2D barcode to a current mobile communication device of the service subscriber. At block 308, a barcode scanner coupled to a computer system scans the one-time use 2D barcode presented on a display of the current mobile communication device.

At block 310, an offer application executing on the computer system decodes the embedded service subscriber information from the one-time use 2D barcode. At block 312, the offer application authenticates the identity of the service subscriber based on the embedded service subscriber information. For example, authenticating the identity of the service subscriber may comprise the service subscriber providing the IMEI of the mobile communication device 102 and/or providing a form of identification (e.g., driver's license, ID card) that matches the service subscriber information embedded on the one-time use 2D barcode. For example, authenticating the identity of the service subscriber comprises the service subscriber providing a driver's license, wherein a first and last name of the driver's license matches a first and last name of the service subscriber information embedded in the one-time use 2D barcode. At block 314, the offer application adapts the offer to the service subscriber based on the service subscriber information decoded from the one-time use 2D barcode. At block 316, the offer application determines the model of the current mobile communication device of the service subscriber.

At block 318, the offer application searches an inventory data store of the wireless communication service provider for a new mobile communication device, wherein the new mobile communication device is an updated model of the current mobile communication device of the service subscriber, wherein the inventory data store is associated with a physical retail location of the wireless communication service provider. At block 320, the offer application locates the new mobile communication device in the inventory data store. At block 322, upon adapting the offer, the offer application presents the adapted offer to the service subscriber, and at block 324 upon accepting the adapted offer, the offer application marks the one-time use 2D barcode as expired in the barcode data store. The one-time use 2D barcode may be restricted from future use once marked as expired in the barcode data store.

Figure 4:
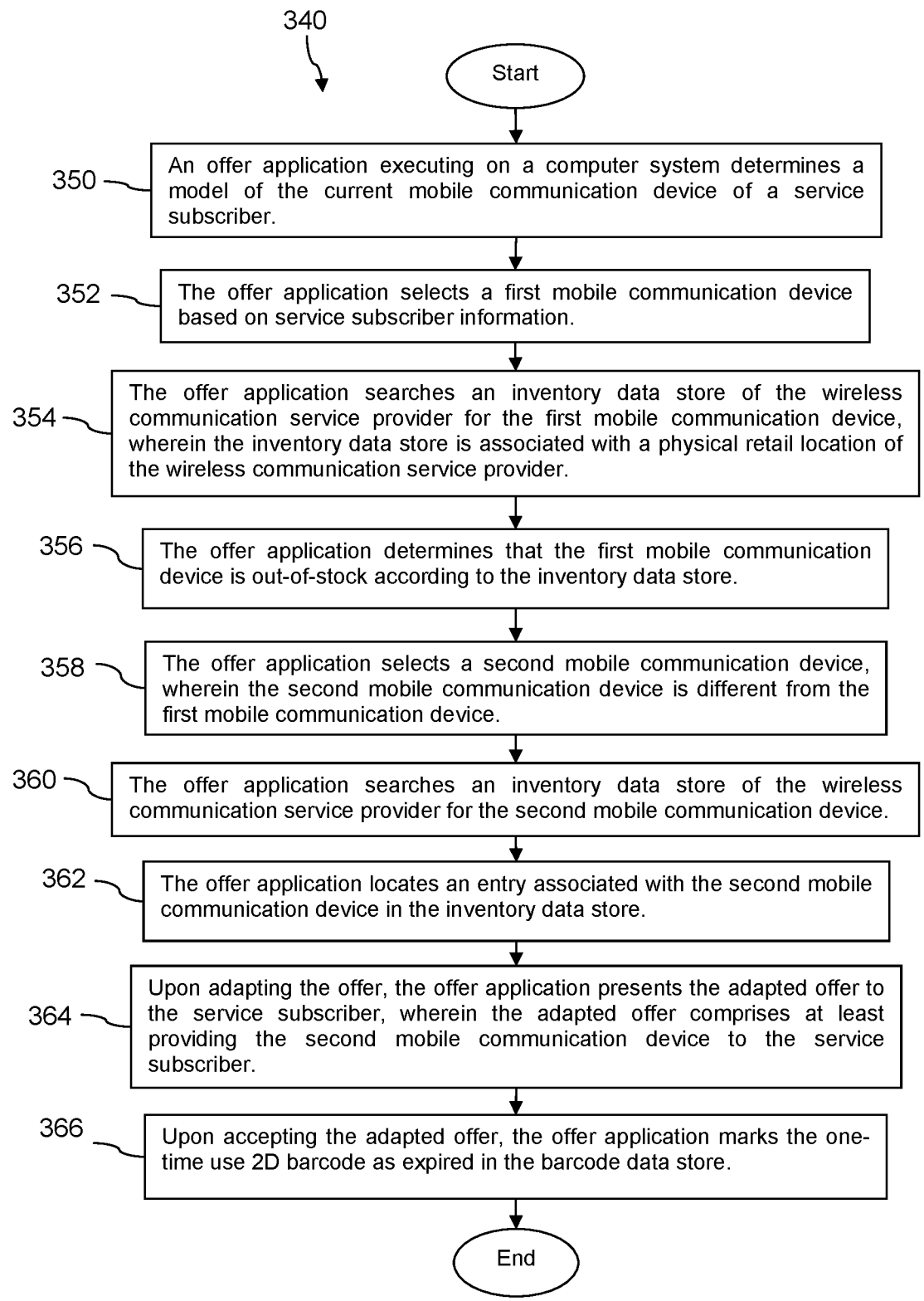
FIG. 4 is a flow chart of yet another method according to an embodiment of the disclosure.

Turning now to FIG. 4, a method 340 is described. At block 350, an offer application executing on a computer system determines a model of the current mobile communication device of a service subscriber. At block 352, the offer application selects a first mobile communication device based on service subscriber information. At block 354, the offer application searches an inventory data store of the wireless communication service provider for the first mobile communication device, wherein the inventory data store is associated with a physical retail location of the wireless communication service provider. At block 356, the offer application determines that the first mobile communication device is out-of-stock according to the inventory data store. At block 358, the offer application selects a second mobile communication device, wherein the second mobile communication device is different from the first mobile communication device.

At block 360, the offer application searches an inventory data store of the wireless communication service provider for the second mobile communication device. At block 362, the offer application locates an entry associated with the second mobile communication device in the inventory data store. At block 364, upon adapting the offer, the offer application presents the adapted offer to the service subscriber, wherein the adapted offer comprises at least providing the second mobile communication device to the service subscriber. At block 366, upon accepting the adapted offer, the offer application marks the one-time use 2D barcode as expired in the barcode data store 144. In an embodiment, the service subscriber is provisioned for wireless communication service in the network infrastructure of the wireless communication service provider.

Figure 5:
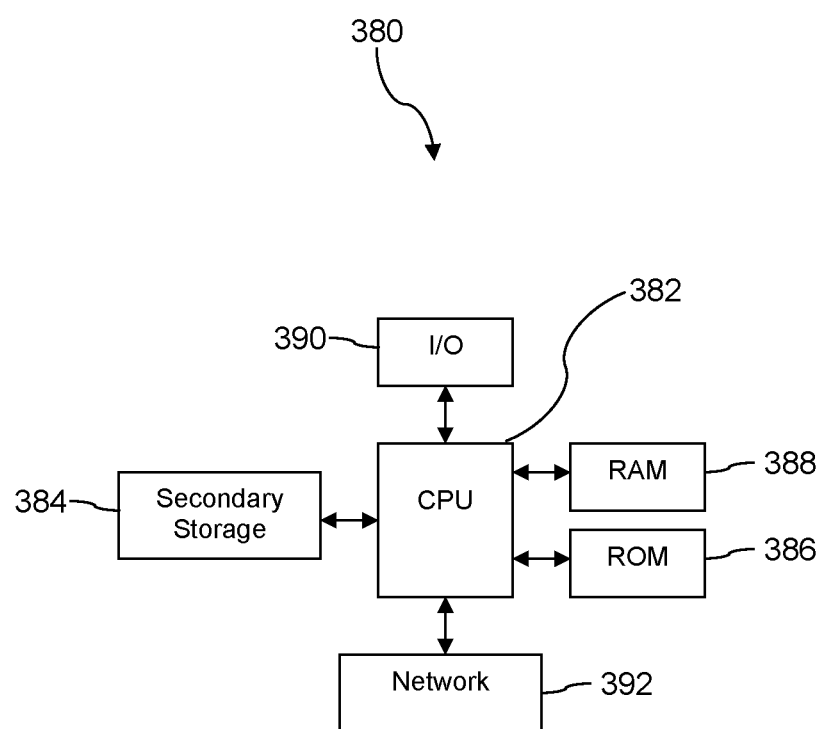
FIG. 5 is a block diagram of a computer system according to an embodiment of the disclosure

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of generating and using a one-time use 2D barcode to provide an authenticated service subscriber with an adapted offer, the method comprising:

generating by a barcode application executing on a network server a one-time use 2D barcode based on service subscriber information associated with a service subscriber, wherein the one-time use 2D barcode is associated with an offer, and wherein the offer is restricted to the service subscriber;

storing the one-time use 2D barcode comprising embedded service subscriber information by the barcode application in a barcode data store;

sending the one-time use 2D barcode by the barcode application to a current mobile communication device of the service subscriber;

presenting the one-time use 2D barcode on a display of the current mobile communication device;

scanning the one-time use 2D barcode by a barcode scanner coupled to a computer system;

decoding, by an offer application executing on the computer system, the embedded service subscriber information from the one-time use 2D barcode;

authenticating the identity of the service subscriber by the offer application based on the embedded service subscriber information;

adapting the offer by the offer application to the service subscriber based on the service subscriber information decoded from the one-time use 2D barcode, wherein adapting the offer comprises:

determining by the offer application a model of the current mobile communication device of the service subscriber;

searching by the offer application an inventory data store of the wireless communication service provider for a new mobile communication device, wherein the new mobile communication device is a more recent model of the current mobile communication device of the service subscriber, wherein the inventory data store is associated with a physical retail location of the wireless communication service provider; and locating the new mobile communication device by the offer application in the inventory data store;

presenting the adapted offer by the offer application to the service subscriber; and upon accepting the adapted offer, marking by the offer application the one-time use 2D barcode as expired in the barcode data store.

2. The method of claim 1, further comprising determining by the offer application a price of the new mobile communication device based on the service subscriber information.

3. The method of claim 1, wherein the new mobile communication device is an updated model of the mobile communication device of the service subscriber.

4. The method of claim 1, wherein the inventory data store is stored at a different location from the physical retail location in a wireless network associated with the first wireless communication service provider.

5. The method of claim 1, wherein the inventory data store is stored in a non-transitory memory of the computer system.

6. The method of claim 1, wherein authenticating the identity of the service subscriber comprises the service subscriber providing an international mobile equipment identity (IMEI) of the current mobile communication device, wherein the embedded service subscriber information comprises the IMEI.

7. The method of claim 1, wherein authenticating the identity of the service subscriber comprises the service subscriber providing a driver's license, wherein a first and last name of the driver's license matches a first and last name of the service subscriber information embedded in the one-time use 2D barcode.

8. A method of generating an adapted offer for use by an authenticated service subscriber based on service subscriber information decoded from a one-time use 2D barcode, the method comprising:

determining, by an offer application executing on a computer system, a model of a current mobile communication device of a service subscriber;

selecting, by the offer application, a first mobile communication device based on the service subscriber information;

searching, by the offer application, an inventory data store of a wireless communication service provider for the first mobile communication device, wherein the inventory data store is associated with a physical retail location of the wireless communication service provider;

determining, by the offer application, that the first mobile communication device is out-of-stock according to the inventory data store;

selecting, by the offer application, a second mobile communication device, wherein the second mobile communication device is different from the first mobile communication device;

searching, by the offer application, the inventory data store of the wireless communication service provider for the second mobile communication device;

locating, by the offer application, an entry associated with the second mobile communication device in the inventory data store;

presenting, by the offer application, the adapted offer to the service subscriber, wherein the adapted offer comprises at least providing the second mobile communication device to the service subscriber; and upon accepting the adapted offer, marking, by the offer application, the one-time use 2D barcode as expired in a barcode data store.

9. The method of claim 8, wherein the first mobile communication device is an updated model of the current mobile communication device.

10. The method of claim 8, wherein the second mobile communication device is a different model than the first mobile communication device.

11. The method of claim 8, wherein the second mobile communication device comprises different hardware features than the first mobile communication device.

12. The method of claim 8, wherein the adapted offer further comprises a price associated with the second mobile communication device, wherein the price is discounted from the retail price of the second mobile communication device.

13. The method of claim 8, wherein the adapted offer further comprises a service plan associated with the first wireless communication service provider.

14. The method of claim 8, wherein the offer application determines the model of the current mobile communication device of the service subscriber based on the service subscriber information decoded from the one-time use 2D barcode.

15. The method of claim 14, further comprising:

prior to determining the model of the current mobile communication device, generating, by a barcode application executing on a network server the one-time use 2D barcode based on the service subscriber information associated with the service subscriber, wherein the one-time use 2D barcode is associated with an offer, and wherein the offer is restricted to the service subscriber;

storing the one-time use 2D barcode comprising embedded service subscriber information by the barcode application in a barcode data store;

sending the one-time use 2D barcode by the barcode application to the current mobile communication device of the service subscriber;

presenting the one-time use 2D barcode on a display of the current mobile communication device;

scanning the one-time use 2D barcode by a barcode scanner coupled to a computer system;

decoding, by the offer application, the embedded service subscriber information from the one-time use 2D barcode; and authenticating the identity of the service subscriber by the offer application based on the embedded service subscriber information.

16. The method of claim 8, wherein the service subscriber information comprises at least one of a first name, a last name, an address, a zip code, an international mobile equipment identity (IMEI), a serial number, the model of the current mobile communication device, a type of the current mobile communication device of the service subscriber, a social media username, a social media handle, or a social media tag.

17. The method of claim 8, wherein the one-time use 2D barcode is one of a QR code, a Semacode, or a ShotCode.

18. The method of claim 1, wherein the offer application determines the model of the current mobile communication device of the service subscriber based on the service subscriber information decoded from the one-time use 2D barcode.

19. The method of claim 1, wherein the service subscriber information comprises at least one of a first name, a last name, an address, a zip code, an international mobile equipment identity (IMEI), a serial number, the model of the current mobile communication device, a type of the current mobile communication device of the service subscriber, a social media username, a social media handle, or a social media tag.

20. The method of claim 1, wherein the one-time use 2D barcode is one of a QR code, a Semacode, or a ShotCode.

* * * * *